Press Spindle Adjustment

N⁰ 78225

PATENTED
MAY 26 1868

Witness
E. W. Bliss
J. W. Bliss

Inventor
Alanson H. Merriman

United States Patent Office.

ALANSON H. MERRIMAN, OF NEW BRITAIN, CONNECTICUT.

*Letters Patent No. 78,225, dated May 26, 1868.*

---

IMPROVEMENT IN PRESS-SPINDLE ADJUSTMENT.

---

*The Schedule referred to in these Letters Patent and making part of the same.*

---

TO ALL WHOM IT MAY CONCERN:

Be it known that I, ALANSON H. MERRIMAN, of New Britain, county of Hartford, and State of Connecticut, have invented certain new and useful Improvements in Adjustments of Press-Spindle; and to enable others skilled in the art to make and use the same, I will proceed to describe its construction and operation by referring to the drawings, in which the same letters indicate like parts in each of the figures.

The nature of this invention consists in the mode of adjusting the length of the spindle, in or to which a tool or die is secured, in its relative position to the work it has to perform; or, in other words, it consists in so constructing the tool-stock or spindle of a press, that the punch or die secured therein can be quickly, easily, and accurately adjusted to any particular point.

In the accompanying drawings—

Figure 1:
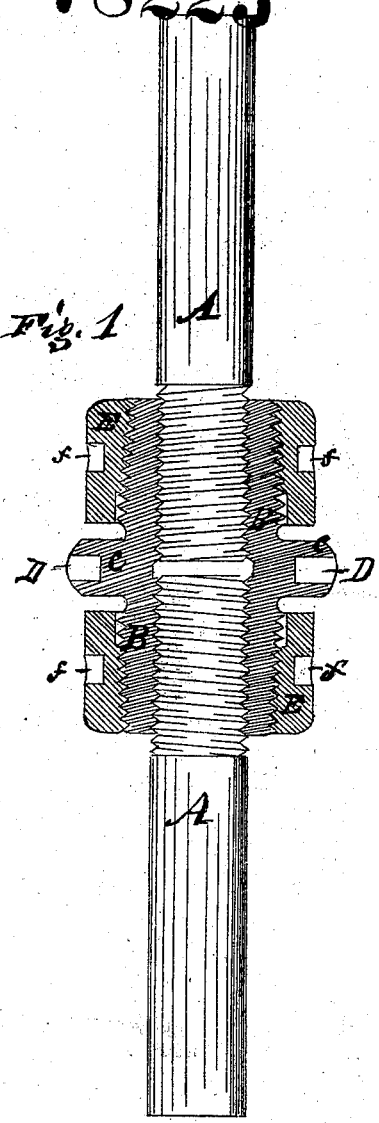
Figure 1 is a sectional side view.
Figure 2:
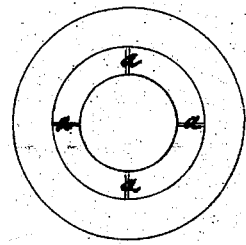
Figure 2 is an end view.

A A, tool-stock holder or spindle, in or to which the punch or die is designed to be secured, in the common way.

B is a sleeve, provided with a central collar, C, by means of which said sleeve is turned in either direction. This collar, C, may be made nut-shape, to receive a wrench, or with orifices, D, to receive an actuating-bar.

The orifice of this sleeve is provided with right and left-hand screw-thread, which is fitted to work closely and freely upon the right and left-hand screw formed on the stock or spindle A A.

This sleeve is also provided with four slits, a, (more or less,) in each end thereof, extending near to the collar C. It is also provided with right and left-hand screws upon its outside surface, and at each end, which is made slightly tapering.

E E are nuts, which are fitted closely and work freely upon each end of the sleeve B. These nuts are or may be made square or nut-form, and provided with sockets, f, to receive an actuating-bar.

Thus it will be seen that by loosening the nuts E, and turning the collar C, the stock or spindle can be easily and quickly adjusted with the greatest degree of accuracy, and again firmly and securely tightened at any desired point.

I believe I have thus shown the nature, construction, and advantage of this invention, so as to enable others skilled in the art to make and use the same therefrom.

What I claim, therefore, and desire to secure by Letters Patent, is—

The combination of the tool-stock or spindle A A with the sleeves B and E, and collar C, arranged and operating substantially as and for the purpose described.

ALANSON H. MERRIMAN. [L. S.]

Witnesses:
E. W. BLISS,
J. W. BLISS.